United States Patent Office 3,555,065
Patented Jan. 12, 1971

3,555,065
1,2,3,5,5,7,7-HEPTAMETHYL-1-TRIFLUORO-PROPYL-CYCLOTETRASILOXANE
James F. Hampton, Midland, Mich., assignor to Dow Corning Corporation, Midland, Mich., a corporation of Michigan
No Drawing. Filed Oct. 21, 1968, Ser. No. 769,419
Int. Cl. C07f 7/08
U.S. Cl. 260—448.2                                  1 Claim

ABSTRACT OF THE DISCLOSURE

A fluoroalkylsiloxane compound which exhibits androgen depressant effects. For example, by orally administering a fluoroalkylsiloxane of the formula

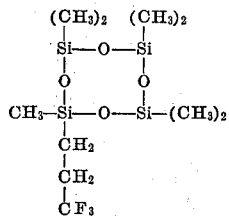

it has been shown that a significant depression of seminal fluid, seminal vesicle, and/or testes weight occurs.

---

This invention relates to a fluoroalkylsiloxane compound and more particularly to a novel fluoroalkylsiloxane compound which can be employed to alter the androgenic capacity of male mammals, e.g., the sex accessory organs of the male (seminal vesicle, prostate) can be reduced in function and/or size.

The fluoroalkylsiloxane of this invention can be used to render a male mammal sterile and can be useful in the treatment of prostatic hypertrophy and prostatic carcinoma by depressing androgenic function in males.

This invention relates to a fluoroalkylsiloxane of the formula

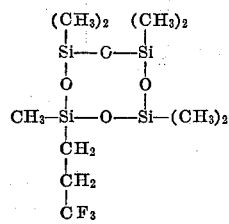

The fluoroalkylsiloxane can be readily prepared by interacting a cyclotrisiloxane of the formula $[(CH_3)_2SiO]_3$ with an organosilicon compound of the formula

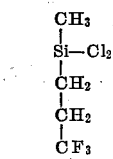

to form the linear polymer of the formula

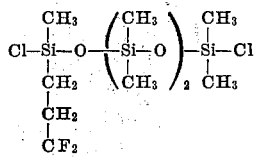

The above interaction occurs under mild conditions in contact with certain catalysts. These certain catalysts can be amines, amine salts of monocarboxylic acids, amine salts of hydrogen halides, ammonium halides, ammonium salts of monocarboxylic acids, quaternary ammonium salts of monocarboxylic acids, quaternary ammonium halides, amides, alkali metal halides, and inert organic solvents having a static dielectric constant greater than 4, and preferably greater than 10.

Illustrative of the catalysts which can be employed are allylamine, butylamine, n-hexylamine, ethylenediamine, di-n-propylamine acetate, triethylamineformate, aniline octoate, p-tolylamine stearate

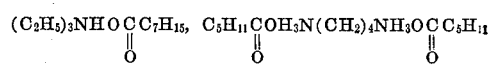

tributylamine hydrobromide, ammonium stearate, tetraethylammonium formate, commercially available n-alkyltrimethyl ammonium halides, o-nitroaniline, histamine, N-ethylacetamide, ethyl carbamate, cyanamide, 2-naphthamide, phenocoll, potassium bromide, chloroform, dichloromethane, methylbutyl ether, capronitrile, nitroethane, formamide, and tetramethylurea amongst many others.

The interaction can operate at room temperature or higher; however, temperatures greater than 150° C. are not normally desirable. The interaction noted herein is well known in the art and complete details can be found in U.S. Pat. 3,162,622, which is incorporated herein by reference.

The linear polymer

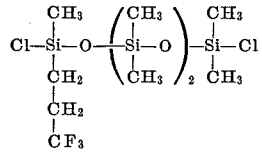

is converted to the fluoroalkylsiloxane via hydrolysis reaction and subsequent intra-molecular condensation, e.g., to a mixture of the linear polymer and a suitable solubilizing solvent such as diethylether, dioxane, acetonitrile, hexane, and cyclohexane, one slowly adds water. The hydrolysis is slightly exothermic, hence the reaction may occur at ambient temperatures. To facilitate the reaction, an acid acceptor, i.e., ammonia or the like may be added, or the mixture can be heated at moderate temperatures, i.e., to about 100° C. The solution is then neutralized, the solvent is stripped, and the fluoroalkylsiloxane isolated by fractionation.

The fluoroalkylsiloxane compound, when administered in a pharmacologically acceptable manner and in a pharmacologically effective amount to male mammals, e.g., rodents, cats, swine, dogs, cattle, deer, fox, and primates (monkeys and man) can alter androgenic functions. The particular alteration of androgenic functions observed include an increase in sex accessory organ function (increased seminal fluid) and size (increased seminal vesicle) with smaller doses and/or a decrease in sex accessory organ function (decreased seminal fluid) and size (decreased seminal vesicle) and a decrease in testicular function (decreased sperm count) with larger doses.

Details regarding mode of administration, dosage, and the like of the fluoroalkylsiloxane to alter androgenic function can be found in U.S. application, Ser. No. 743,-602, filed July 10, 1968.

The following examples are illustrative only and should not be construed as limiting the invention which is properly delineated in the appended claims.

EXAMPLE 1

Six hundred sixty-six grams (3.0 mols) of

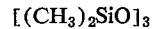

329 grams of CH₃CN, 16.4 grams of dimethylacetamide, and 633 grams (3.0 mols) of

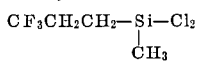

were placed in a one-gallon glass container and vigorously mixed on a roller. The mixture became homogeneous in about three hours, but was permitted to mix for 21 additional hours at room temperature. Gas liquid chromatography analysis of this change revealed complete conversion of the [(CH₃)₂SiO]₃ to the expected products. Gas liquid chromatography revealed an area percentage of 79.1 percent

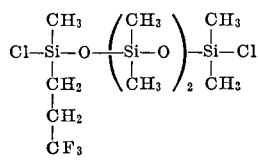

Distillation provided 854.6 grams (1.97 mols) of the 1,7 - dichloroheptamethyltrifluoropropyltetrasiloxane. The product had a boiling point of 119° C. at 12 mm. Hg, $n_D^{25}$ 1.3925, $d^{25}$ 1.0868 g./ml., and a distilled yield of 65.6 percent.

*Analysis.*—Calc'd for $C_{10}Si_4H_{25}O_3F_3Cl_2$ (percent): Cl, 16.36; MR$_D$, 95.23. Found (percent): Cl, 16.41; MR$_D$, 95.10.

One hundred ninety-two grams (0.442 mol) of 1,7-dichloroheptamethyltrifluoropropyltetrasiloxane, 25 grams of diethyl ether, and 46.7 grams (0.442 mol) anhydrous sodium carbonate were placed in a 500 ml. three-necked round-bottom flask equipped with a reflux condenser, stirring assembly, and additional funnel. This mixture was hydrolyzed by dropwise addition (about 4.0 hours) of 7.95 grams (0.442 mol) of distilled water, with vigorous stirring. After the system became neutral, it was dried with 10 grams of Na₂SO₄, filtered, and vacuum stripped for three hours on an evaporator. A 139 gram residue resulted which when analyzed by gas liquid chromatography was found to be >95 percent

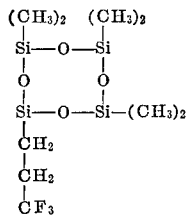

Distallation provided 119.4 grams (0.316 mol) of the heptamethyltrifluoropropylcyclotetrasiloxane having a boiling point of 87° C. at 16 mm. Hg, $n_D^{25}$ 1.3818, $d^{25}$ 1.0501 g./ml., and a distilled yield of 71.5 percent.

*Analysis.*—calc'd for $C_{10}Si_4H_{25}O_4F_3$ (percent): Si, 29.67; C, 31.72; H, 6.66; F, 15.05; MR$_D$, 84.61. Found (percent): Si, 29.7; C, 31.8; H, 6.51; F, 15.3; MR$_D$ 83.88.

EXAMPLE 2

This example illustrates the structure-activity-relationship between rat androgen-depressant activity and the fluoroalkylsiloxane of this invention.

A group of male rats (Sprague-Dawley strain) were orally dosed with the fluoroalkylsiloxane compound which was diluted in sesame oil. Oral administration was achieved via gastric intubation. The period of dosage was six days at dosage level of 100 mg. per kilogram of body weight. Final body weights were determined in the fasted state just prior to sacrifice. Sacrifice was carried out on day seven. Various organ weights were determined and ratios of the organ weights (grams) to final body weight (grams) were determined for comparison in both control and treated animals.

The table below indicates the structure-activity-relationship referred to above with respect to dosage for effect.

The dosages represent threshold doses for depression of seminal fluid, Seminal vesicle, and/or tests weight ratios.

STRUCTURE-ACTIVITY-RELATIONSHIP BETWEEN ANDROGEN DEPRESSANT ACTIVITY AND THE FLUOROALKYLSILOXANE COMPOUNDS ADMINISTERED ORALLY

Compound:

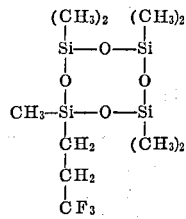

| | |
|---|---|
| Daily dose, mg./g. | 100 |
| Number of daily doses | 6 |
| Sacrifice day following first dose | 7 |
| Spices | Rat |

That which is calimed is:
1. The fluoroalkylsiloxane of the formula

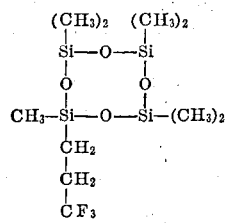

| | | | |
|---|---|---|---|
| 2,934,549 | 4/1960 | Tarrant et al. | 260—448.2 |
| 2,979,519 | 4/1961 | Pierce et al. | 260—448.2 |
| 3,070,617 | 12/1962 | Holbrook | 260—448.2 |
| 3,269,984 | 8/1966 | Vaughn | 260—448.2X |

TOBIAS E. LEVOW, Primary Examiner

P. F. SHAVER, Assistant Examiner

U.S. Cl. X.R.

424—184